United States Patent
Wyszka et al.

(10) Patent No.: US 12,017,530 B2
(45) Date of Patent: Jun. 25, 2024

(54) HUMAN-MACHINE INTERACTION IN A MOTOR VEHICLE

(71) Applicant: Volkswagen Aktiengesellschaft, Wolfsburg (DE)

(72) Inventors: Robert Jan Wyszka, Hannover (DE); Daniel Morales Fernández, Braunschweig (DE); Adrian Haar, Hannover (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 293 days.

(21) Appl. No.: 17/612,967

(22) PCT Filed: Apr. 24, 2020

(86) PCT No.: PCT/EP2020/061552
§ 371 (c)(1),
(2) Date: Nov. 19, 2021

(87) PCT Pub. No.: WO2020/224997
PCT Pub. Date: Nov. 12, 2020

(65) Prior Publication Data
US 2022/0250474 A1 Aug. 11, 2022

(30) Foreign Application Priority Data

May 9, 2019 (DE) .......................... 102019206749.2

(51) Int. Cl.
*B60K 35/00* (2024.01)
*G02B 27/01* (2006.01)
(Continued)

(52) U.S. Cl.
CPC .......... *B60K 35/00* (2013.01); *G02B 27/0101* (2013.01); *G02B 27/017* (2013.01);
(Continued)

(58) Field of Classification Search
CPC ............ B60K 35/00; B60K 2370/1529; B60K 2370/194; B60K 2370/177;
(Continued)

(56) References Cited

U.S. PATENT DOCUMENTS 8,767,014 B2  7/2014 Vaught et al.
9,317,759 B2  4/2016 Inada et al.
(Continued)

FOREIGN PATENT DOCUMENTS

CN  103140382 A  6/2013
CN  104071096 A  10/2014
(Continued)

OTHER PUBLICATIONS

PCT/EP2020/061552. International Search Report (Jul. 21, 2020).
(Continued)

*Primary Examiner* — Tom V Sheng
(74) *Attorney, Agent, or Firm* — Peter Zura; LOZA & LOZA, LLP

(57) ABSTRACT

Technologies and techniques for human-machine interaction in a motor vehicle, wherein a first graphical element is superimposed into a visual field of a user via an AR system such that the element is arranged within a display region. A scrolling input signal is detected via an input interface and a sensor system to determine a highlighted direction. Using a computing unit, a scrolling path is determined on the basis of the highlighted direction. Using the AR system, the first graphical element is moved out of the display region along the scrolling path, depending on the scrolling input signal.

17 Claims, 1 Drawing Sheet

(51) Int. Cl.
*G06F 3/0482* (2013.01)
*G06F 3/0485* (2022.01)
*B60K 35/10* (2024.01)
*B60K 35/23* (2024.01)
*B60K 35/28* (2024.01)
*B60K 35/29* (2024.01)

(52) U.S. Cl.
CPC .......... *G06F 3/0482* (2013.01); *G06F 3/0485* (2013.01); *B60K 35/10* (2024.01); *B60K 35/23* (2024.01); *B60K 35/28* (2024.01); *B60K 35/285* (2024.01); *B60K 35/29* (2024.01); *B60K 2360/113* (2024.01); *B60K 2360/149* (2024.01); *B60K 2360/177* (2024.01); *B60K 2360/191* (2024.01); *G02B 2027/014* (2013.01); *G02B 2027/0178* (2013.01)

(58) Field of Classification Search
CPC ........ B60K 2370/149; B60K 2370/113; B60K 2370/191; B60K 35/10; B60K 35/23; B60K 35/28; B60K 35/29; B60K 35/285; B60K 2360/1529; B60K 2360/194; B60K 2360/177; B60K 2360/149; B60K 2360/113; B60K 2360/191; G02B 27/0101; G02B 27/017; G02B 2027/014; G02B 2027/0178; G06F 3/0482; G06F 3/0485
USPC ............................................................ 345/7
See application file for complete search history.

(56) References Cited

U.S. PATENT DOCUMENTS

| | | | |
|---|---|---|---|
| 10,095,379 B2 | 10/2018 | Ecker et al. | |
| 10,453,176 B2 | 10/2019 | Takazawa | |
| 10,766,498 B2 | 9/2020 | Kleen et al. | |
| 11,198,398 B2* | 12/2021 | Mori | B60K 35/00 |
| 11,307,047 B2 | 4/2022 | Bagschik et al. | |
| 2010/0318908 A1 | 12/2010 | Neuman et al. | |
| 2010/0318928 A1 | 12/2010 | Neuman et al. | |
| 2014/0289631 A1* | 9/2014 | Onaka | G06F 3/0488 |
| | | | 715/825 |
| 2015/0091943 A1* | 4/2015 | Lee | G06F 3/013 |
| | | | 345/633 |
| 2016/0207399 A1 | 7/2016 | Ogasawara | |
| 2017/0270711 A1* | 9/2017 | Schoenberg | A63F 13/213 |
| 2017/0287222 A1* | 10/2017 | Fujimaki | G06F 3/017 |
| 2018/0045963 A1* | 2/2018 | Hoover | G02B 27/017 |
| 2018/0067307 A1 | 3/2018 | Liubakka et al. | |
| 2018/0137601 A1* | 5/2018 | Takazawa | G02B 27/0101 |
| 2018/0370567 A1 | 12/2018 | Rowell | |
| 2019/0004325 A1* | 1/2019 | Connor | G02B 27/0172 |
| 2019/0226866 A1* | 7/2019 | Chang | G06V 20/20 |
| 2021/0291657 A1* | 9/2021 | Kühne | B60K 35/00 |
| 2023/0161158 A1* | 5/2023 | Belkin | G02B 27/0101 |
| | | | 359/630 |
| 2023/0161159 A1* | 5/2023 | Belkin | G02B 27/0025 |
| | | | 359/630 |

FOREIGN PATENT DOCUMENTS

| | | |
|---|---|---|
| CN | 107128313 A | 9/2017 |
| CN | 108072977 A | 5/2018 |
| CN | 109285372 A | 1/2019 |
| CN | 109484299 A | 3/2019 |
| DE | 102010041584 A1 | 3/2012 |
| DE | 102013019263 A1 | 5/2015 |
| DE | 102013225496 A1 | 6/2015 |
| DE | 102014214516 A1 | 1/2016 |
| DE | 102016225639 A1 | 7/2018 |
| DE | 102017216774 A1 | 3/2019 |
| EP | 2783892 A2 | 10/2014 |
| EP | 3367227 A1 | 8/2018 |
| WO | 2018114078 A1 | 6/2018 |

OTHER PUBLICATIONS

DE102019206749.2. Examination Report (Feb. 6, 2020).
Corresponding Chinese Application No. 202080042197.9. Office Action (Mar. 26, 2024).

* cited by examiner

HUMAN-MACHINE INTERACTION IN A MOTOR VEHICLE

CROSS REFERENCE TO RELATED APPLICATION

The present application claims priority to International Patent App. No. PCT/EP2020/061552 to Wyszka et al., titled "Human-Machine Interaction in a Motor Vehicle", filed Apr. 24, 2020, which claims priority to German Patent App. No 10 2019 206 749.2, filed May 9, 2019, the contents of each being incorporated by reference in their entirety herein.

FIELD OF TECHNOLOGY

The present disclosure relates to technologies and techniques for human-machine interaction in a motor vehicle, wherein a first graphical element is superimposed into a visual field of a user of said motor vehicle by means of an augmented reality system of said motor vehicle such that said first graphical element is arranged within a display region. The scrolling input signal is detected by means of an input interface of said motor vehicle. Furthermore, the present disclosure relates to human-machine interface device for a motor vehicle, and a computer program.

BACKGROUND

With existing approaches to human-machine interaction, when scrolling through a list of objects while driving, for example, a list of multimedia objects, such as songs or music albums, or a contact list, the driver of a motor vehicle must direct his/her attention and his/her gaze for a certain time on the graphical representation of the list. This type of interaction can, on the one hand, be slow and, on the other hand, dangerous because it distracts the driver from controlling the motor vehicle.

Document US 2018/0067307 A1 describes a head-up display for a motor vehicle which has a screen that is connected to a windshield of the motor vehicle. The screen can be used, for example, to display augmented reality data.

Document DE 10 2016 225 639 A1 relates to a head-up display device for a motor vehicle. Here, the displayed image is shifted horizontally or vertically in accordance with the course of the road lying ahead of the motor vehicle. When cornering, the image is shifted dynamically in order to keep the information in the driver's visual field. The contents can be shifted such that they appear centered relative to the driver's lane.

SUMMARY

Against this background, it is an object of the present disclosure to provide an improved concept for human-machine interaction in a motor vehicle that results in increased safety.

According to the present disclosure, this object is achieved by a method for human-machine interaction, a human-machine interface device and a computer program according to the claims contained herein. Advantageous further developments and further configurations are the subject of the dependent claims.

The improved concept is based on the idea of superimposing a graphical element in a visual field of the user by means of an augmented reality system and of moving the same along a scrolling path that depends on a highlighted direction as determined by means of a sensor system of the motor vehicle.

In some examples, a method is disclosed for human-machine interaction in a motor vehicle is specified, wherein a first graphical element is superimposed into a visual field of the user of the motor vehicle by means of an augmented reality system (AR system) of the motor vehicle such that the first graphical element is arranged within a display region, for example a display region of a display area of the AR system. A scrolling input signal is detected by means of an input interface of the motor vehicle. A highlighted direction, for example of an environment of the motor vehicle or an environment of the user, is determined by means of a sensor system of the motor vehicle. A scrolling path is determined depending on the highlighted direction by means of a computing unit of the motor vehicle. Depending on the scrolling input signal, the first graphical element is moved out of the display region along the scrolling path by means of the AR system.

Depending on the scrolling input signal, a second graphical element may be moved into the display region, for example, superimposed to the visual field, along said scrolling path by means of the AR system.

Superimposing the graphical elements into the user's visual field includes, for example, displaying the graphical elements in the display area of the AR system or projecting the graphical elements onto the display area of the AR system.

The display region is, for example, a sub-region of the display area where an object, for example one of the graphical elements, is located when it is currently selected by the user or by an infotainment system of the motor vehicle.

The scrolling input signal may be configured as a command that is generated by a user input for scrolling through or browsing a list of objects in the display area, and which list, for example, includes the first and the second graphical elements, for example when the first graphical element has been selected, for selecting the second graphical element or another graphical element.

The scrolling path is, for example, a perspective or apparent direction or a perspective or apparent path along which the first and second graphical elements appear to be moved in the user's visual field or in the display area for the user. Due to the two-dimensional configuration of the display area, perspective adjustments, for example an adjustment of the size of the graphical objects, can be made along the scrolling path in order to create a realistic visual impression for the user, in that, for example, the graphical objects seem to move away from the user or to move towards the user along the image path.

The highlighted direction is, for example a direction or a directional course of an environment of the motor vehicle, for example a direction or a directional course of one or more lane marking lines or lane edges. The highlighted direction can also be a viewing direction of the user.

The present disclosure also includes further developments of the method according to the present disclosure having features as those that have already been described in connection with the further developments of the human-machine interface device according to the present disclosure. For this reason, the corresponding further developments of the method according to the present disclosure are not described again for the purposes of brevity.

The present disclosure also comprises the combinations of the features of the embodiments as described.

BRIEF DESCRIPTION OF THE DRAWINGS

Exemplary embodiments of the present disclosure are described below. In the figures.

DETAILED DESCRIPTION

Figure 1:
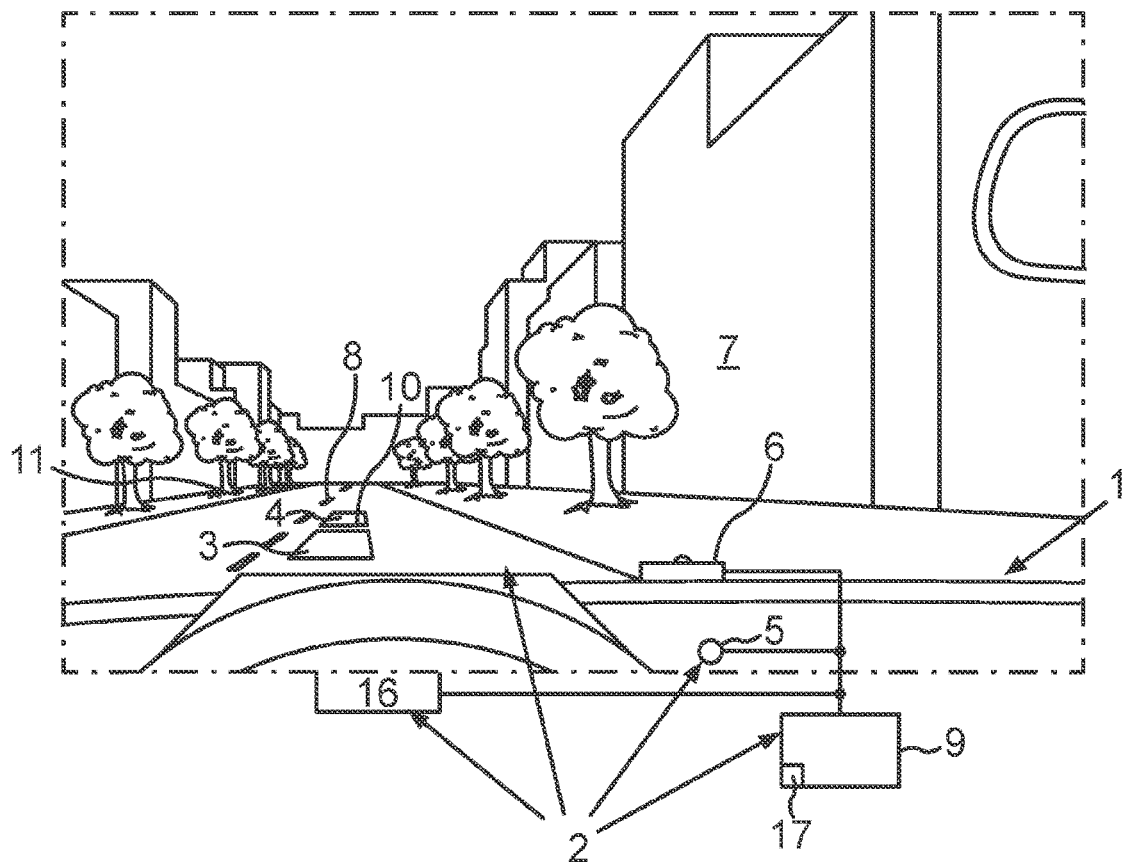
FIG. 1 shows a motor vehicle with a schematic representation of an exemplary embodiment of a human-machine interface device according to some aspects of the present disclosure.

The exemplary embodiment as explained below is a preferred embodiment of the present disclosure. In the exemplary embodiment, the described components of the embodiment each represent individual features of the present disclosure that are to be considered independently of one another, which, moreover, improve the present disclosure independently of one another and are therefore also to be regarded as part of the present disclosure, either individually or in combinations other than the one shown. Furthermore, the described embodiment can be supplemented by further features of the present disclosure, as described previously.

In the figures, functionally identical elements are provided with the same reference numerals.

As described herein, by superimposing the graphical elements into the user's visual field, the user does not have to take his/her eyes off the road in order to view the graphical elements. This makes the human-machine interaction according to the improved concept safer. In addition, by linking the scrolling path with the highlighted direction, a direction of movement of the graphical elements can be adapted to a current situation of the user or an environment of the motor vehicle, whereby any distraction caused by the display or the movement of the graphical objects is minimized and the safety for the driver can be further increased.

In some examples, a vanishing direction of the graphical elements or of the graphical elements together with further graphical elements of the list, which includes the first and the second graphical elements, can coincide or can approximately coincide with a vanishing direction of the highlighted direction. The highlighted direction and the graphical elements of the list are thus adapted relative to each another, for example in such a way that any driver distraction can be minimized.

In some examples, depending on the scrolling input signal, a plurality, that is to say three or more of graphical elements, is moved along the scrolling path, wherein the plurality of graphical elements includes the first and second graphical elements.

Depending on the scrolling input signal, the plurality of graphical elements that correspond to the list of graphical elements or objects is scrolled through or browsed.

According to at least one embodiment, the scrolling path is at least partially parallel, anti-parallel or tangential relative to the highlighted direction.

According to at least one embodiment, a speed of movement by which the first graphical element is moved out of the display region and/or by which the second graphical element is moved along the scrolling path into the display region is adapted by means of the augmented reality system, depending on a driving speed of the motor vehicle.

As a result, better integration of the movement of the graphical elements into the overall visual perception of the user of the motor vehicle and thus improved safety can be achieved.

According to at least one embodiment, the sensor system may be used to determine a direction of a lane marking and/or a lane boundary and/or a lane edge, in particular in the environment of the motor vehicle, as the highlighted direction.

For example, depending on the vanishing direction of the road or the lane markings, the lane boundary and/or the lane edge, the vanishing direction of the graphical elements can be aligned such that a common alignment of the movement of AR information in the form of the graphical elements and real objects becomes possible. This increases the safety for the driver due to less intense distraction.

According to at least one embodiment, a viewing direction of the user is determined as the highlighted direction by means of the sensor system.

The movement along the scrolling path can thus be substantially the same or the same as the viewing direction of the driver, whereby a particularly low distraction and thus a particularly high level of safety can be achieved.

In some examples, a human-machine interface device for a motor vehicle is described which has an AR system, an input interface, a sensor system, and a computing unit. The AR system is configured to superimpose a first graphical element into a visual field of a user of the motor vehicle in such a way that the first graphical element is arranged within a display region. The input interface is configured to detect a scrolling input signal. The sensor system is configured to determine a highlighted direction, in particular an environment of the motor vehicle or an environment of the user. The computing unit is configured to determine a scrolling path depending on the highlighted direction. The AR system is configured to move the first graphical element out of the display region along the scrolling, path depending on the scrolling input signal.

The AR system may be configured to move a second graphical element into the display region along the scrolling path, depending on the scrolling input signal.

In some examples, the AR system includes a head-up display system for superimposing the first graphical element, and in particular the second graphical element, into the visual field.

In such systems, the display area can advantageously correspond to a windshield of the motor vehicle or to a part of the windshield.

In some examples, the AR system includes a head mounted display unit for superimposing the first graphical element, and in particular the second graphical element, into the visual field.

The head mounted display unit (HMD) can be, in particular, an AR glasses system, data glasses, or smart glasses.

According to at least one embodiment, the sensor system is designed as an environmental sensor system and configured to determine a direction of a lane marking and/or a lane boundary and/or a lane edge in an environment of the motor vehicle as the highlighted direction.

According to at least one embodiment, the sensor system is designed as a gaze detection system, for example, as an eye tracker, and it is configured to determine a viewing direction of the user as the highlighted direction.

Further embodiments of the human-machine interface device follow directly from the various configurations of the method for a human-machine interaction according to the improved concept, and vice versa. In particular, the human-machine interface device can be configured or programmed to carry out a method according to the improved concept, or such a human-machine interface device carries out a method according to the improved concept.

In some examples, a computer program with commands is disclosed, wherein the commands, when the computer program is executed by a human-machine interface device according to the improved concept, cause the human-machine interface device to carry out a method according to the present disclosure.

In some examples, a computer-readable storage medium is disclosed, where a computer program according to the present disclosure is stored.

In some examples, a motor vehicle is disclosed that includes a human-machine interface device and/or a computer-readable storage medium according to the present disclosure.

FIG. 1 shows a motor vehicle 1, in particular from the perspective of a driver of the motor vehicle 1. The motor vehicle 1 has a human-machine interface device 2 in some examples.

The human-machine interface device 2 has, in particular, a head-up display which uses part of a windshield of the motor vehicle 1 as a display area 11, and which contains a computing unit 9. The head-up display also has an image generation and optical unit 16 which is configured to generate an image based on graphical data provided by the computing unit 9, for example, in form of a graphics file or in form of control commands, and to project the image onto the display area 11.

The human-machine interface device 2 also has an input interface 5 which can be designed as a rotary knob, for example. A user of the motor vehicle 1 can operate, that is to say rotate, the rotary knob or the input interface 5 in order to generate a scrolling input signal.

The human-machine interface device 2 also includes a sensor system 6, which can be designed as a camera system, for example, in order to detect and visualize an environment 7 of the motor vehicle 1.

A first and a second graphical element 3, 4 are shown in the display area 11, wherein the first graphical element 3, for example, was selected at the time by the user and arranged in a display region of the display area 11.

Optionally, the human-machine interface device 2 or the computing unit 9 can have a computer-readable storage medium 17, where a computer program according to the improved concept is stored. The computing unit 9 can execute the computer program, for example, to cause the human-machine interface device 2 to carry out a method according to the improved concept.

Figure 2:
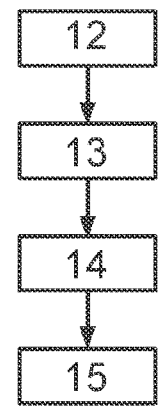
FIG. 2 shows a schematic flow chart of a method for a human-machine interaction according to some aspects of the present disclosure.

The function of the human-machine interface device 2 is explained in more detail with reference to the flowchart of a method for human-machine interaction according to the improved concept shown in FIG. 2.

In a step 12 of the method, controlled by the computing unit 9, the first graphical element 3 is superimposed into the display region of the display area 11, which corresponds to the currently selected object, into the user's visual field by means of the image generation and optical unit 16.

In step 13 of the method, for example, the user operates the rotary knob 5 to generate the scrolling input signal.

In step 14 of the method, a highlighted direction 8 in an environment 7 of the motor vehicle 1 is determined by means of the sensor system 6. For example, the highlighted direction 8 can correspond to a lane marking line. In addition, in step 14, a scrolling path 10 is determined depending on the highlighted direction 8. For example, the scrolling path 10 can correspond to a line which has a common vanishing point with the highlighted direction 8.

In step 15 of the method, the first and second graphical elements 3, 4 are moved along the scrolling path 10 in response to the scrolling input signal. In particular, the graphical elements 3, 4 can be part of a list of graphical objects or elements the user can browse or through which he can scroll by operating the input interface 5. By scrolling, for example, the first graphical element 3 is moved out of the display region and the second graphical element 4 is moved into the display region, and it can be particularly selected. Alternatively, a further graphical element can be selected in that the second graphical element is also moved out of the display region, that is to say it is being scrolled out, and the further graphical element is moved into the display region and remains there, for example.

Such a configuration increases the driver's safety by achieving better embedding of a movement of graphical elements within the visual field of the user of the motor vehicle. Because graphical content can be displayed relative to the road in a straight or curved shape by means of AR, the user of the motor vehicle can keep his/her eyes on the road while browsing the graphical elements. By means of adaptation, especially dynamic adaptation, of the scrolling path, driver distractions can be minimized. With the use of an AR system, further user interactions can moreover be implemented, for example, handwriting recognition for selecting a specific position from a list of graphical elements, or gesture control.

The use of AR glasses systems while driving can improve the user's interaction with the vehicle and improve safety. In embodiments, the user can communicate with the input interface, for example, via eye movements, voice commands, switches, scanners, or touch-sensitive components.

The improved concept can be used for fully manually operated motor vehicles as well as for partially or fully automatically operated vehicles.

LIST OF REFERENCE NUMERALS 1 motor vehicle
2 human-machine interface device
3, 4 graphical elements
5 input interface
6 sensor system
7 environment
8 highlighted direction
9 computing unit
10 scrolling path
11 display area
12, 15 method steps
16 image generation and optical unit
17 computer-readable storage medium

The invention claimed is:

1. A method for human-machine interaction in a motor vehicle, comprising:
   superimposing a first graphical element into a visual field of a user of the motor vehicle via an augmented reality system, wherein the first graphical element is configured within a display region;
   detecting a scrolling input signal via an input interface of the motor vehicle;
   determining a highlighted direction via a sensor system of the motor vehicle;
   determining a scrolling path based on the highlighted direction via a computing unit;

depending on the detected scrolling input signal, moving the first graphical element along the scrolling path out of the display region via the augmented reality system; and depending on the detected scrolling input signal, moving a second graphical element along the scrolling path into the display region via the augmented reality system, wherein the scrolling input signal comprises a command generated by user input for scrolling through or browsing a list of objects on the display region comprising the first and second graphical elements.

2. The method of claim 1, wherein, depending on the scrolling input signal, a plurality of graphical elements moves along said scrolling path, wherein the plurality of graphical elements includes the first and second graphical elements.

3. The method of claim 1, wherein a speed of movement with which the first graphical element is moved out of the display region is adapted via the augmented reality system depending on a driving speed of the motor vehicle.

4. The method of claim 1, wherein a direction of at least one of a lane marking, a lane boundary, and/or a lane edge is determined as the highlighted direction via the sensor system.

5. The method of claim 4, wherein a viewing direction of the user is determined as the highlighted direction via the sensor system.

6. A human-machine interface device for a motor vehicle, comprising:
an augmented reality system configured to superimpose a first graphical element into a visual field of a user of the motor vehicle in such a way such that said first graphical element is arranged within a display region;
an input interface configured to detect a scrolling input signal;
a sensor system configured to determine a highlighted direction; and
a computing unit configured to determine a scrolling path, depending on the highlighted direction,
wherein the augmented reality system is configured to move the first graphical element out of the display region along the scrolling path, depending on the scrolling input signal, and the augmented reality system is configured to move a second graphical element into the display region along the scrolling path, depending on the scrolling input signal,
and wherein the scrolling input signal comprises a command generated by user input for scrolling through or browsing a list of objects in the display area, part of which are the first and second graphical elements.

7. The human-machine interface of claim 6, wherein the augmented reality system comprises a head-up display system for superimposing said first graphical element into the visual field.

8. The human-machine interface of claim 6, wherein the augmented reality system comprises a wearable display unit for superimposing the first graphical element into the visual field.

9. The human-machine interface of claim 8, wherein the wearable display unit comprises one of an AR glasses system, data glasses or smart glasses.

10. The human-machine interface of claim 6, wherein the sensor system comprises an environmental sensor system and is configured to determine a direction of at least one of a lane marking, a lane boundary, and/or a lane edge as the highlighted direction.

11. The human-machine interface of claim 6, wherein the sensor system comprises a gaze detection system and is configured to determine a viewing direction of the user as the highlighted direction.

12. The human-machine interface of claim 6, wherein the operation comprises one or more vehicle functions for navigating towards the location of the vehicle at the estimated departure time.

13. A non-transitory computer-readable medium having stored therein instructions executable by one or more processors for operating a human-machine interface device, to:
superimpose a first graphical element into a visual field of a user of the motor vehicle via an augmented reality system, wherein the first graphical element is configured within a display region;
detect a scrolling input signal via an input interface of the motor vehicle;
determine a highlighted direction via a sensor system of the motor vehicle;
determine a scrolling path based on the highlighted direction via a computing unit;
depending on the detected scrolling input signal, move the first graphical element along the scrolling path out of the display region via the augmented reality system; and
depending on the detected scrolling input signal, move a second graphical element along the scrolling path into the display region via the augmented reality system,
wherein the scrolling input signal comprises a command generated by user input for scrolling through or browsing a list of objects on the display region comprising the first and second graphical elements.

14. The non-transitory computer-readable medium of claim 13, wherein the instructions are configured to, depending on the scrolling input signal, move a plurality of graphical elements along said scrolling path, wherein the plurality of graphical elements includes the first and second graphical elements.

15. The non-transitory computer-readable medium of claim 13, wherein a speed of movement with which the first graphical element is moved out of the display region is adapted via the augmented reality system depending on a driving speed of the motor vehicle.

16. The non-transitory computer-readable medium of claim 13, wherein a direction of at least one of a lane marking, a lane boundary, and/or a lane edge is determined as the highlighted direction via the sensor system.

17. The non-transitory computer-readable medium of claim 13, wherein a viewing direction of the user is determined as the highlighted direction via the sensor system.

* * * * *